(12) United States Patent
Jang et al.

(10) Patent No.: US 9,451,663 B2
(45) Date of Patent: Sep. 20, 2016

(54) APPARATUS FOR DRIVING LIGHT EMITTING DIODE

(71) Applicant: J&C TECHNOLOGY CO., LTD, Gyeongsangbuk-do (KR)

(72) Inventors: Min Jun Jang, Gyeonggi-do (KR); Woo Jun Jang, Gyeongsangbuk-do (KR)

(73) Assignee: J&C TECHNOLOGY CO., LTD., Gimcheon-si, Gyeongsangbuk-do (KR)

( * ) Notice: Subject to any disclaimer, the term of this patent is extended or adjusted under 35 U.S.C. 154(b) by 0 days.

(21) Appl. No.: 14/892,719

(22) PCT Filed: May 22, 2014

(86) PCT No.: PCT/KR2014/004561
§ 371 (c)(1),
(2) Date: Nov. 20, 2015

(87) PCT Pub. No.: WO2014/189298
PCT Pub. Date: Nov. 27, 2014

(65) Prior Publication Data
US 2016/0095179 A1 Mar. 31, 2016

(30) Foreign Application Priority Data
May 23, 2013 (KR) .................. 10-2013-0058456

(51) Int. Cl.
H05B 33/08 (2006.01)

(52) U.S. Cl.
CPC ........ *H05B 33/0824* (2013.01); *H05B 33/083* (2013.01); *H05B 33/0809* (2013.01); *H05B 33/0815* (2013.01); *H05B 33/0845* (2013.01)

(58) Field of Classification Search
CPC .......... H05B 33/0824; H05B 33/0809; H05B 33/0815; H05B 33/0845; H05B 33/083; H05B 37/0809; H05B 37/0821; H05B 37/029
USPC ............ 315/125, 186–188, 193, 200 R, 205, 315/209 R, 217, 225, 227 R, 232, 237, 291, 315/295, 297, 307–308, 318, 325
See application file for complete search history.

(56) References Cited

U.S. PATENT DOCUMENTS 6,028,776 A 2/2000 Ji et al.
6,989,807 B2 1/2006 Chiang
(Continued)

FOREIGN PATENT DOCUMENTS

HK GB 2517537 A * 2/2015 ............... H01S 5/06
JP 4581646 B2 11/2010
(Continued)

OTHER PUBLICATIONS

European Search Report dated Mar. 11, 2016.
(Continued)

*Primary Examiner* — Jimmy Vu
*Assistant Examiner* — Henry Luong
(74) *Attorney, Agent, or Firm* — Rabin & Berdo, P.C.

(57) ABSTRACT

The present invention relates to an apparatus for driving a light emitting diode. The apparatus for driving the light emitting diode according to the present invention comprises a rectifier circuit for accessing an Alternating Current (AC) voltage source to rectify an AC voltage of the AC voltage source, a light emitting diode array connected to an output side of the rectifier circuit and including a plurality of light emitting diode array blocks, and a charging/discharging circuit configured to be charged by a voltage output from the rectifier circuit, wherein the apparatus for driving the light emitting diode comprises a discharging switch, a block switch circuit, and a controller. The apparatus for driving the light emitting diode according to the present invention can apply a voltage equal to or larger than a driving voltage to intervals around a phase of 180 degrees in which the light emitting diode cannot be driven since a size of the voltage applied by the AC voltage source is smaller than or equal to the driving voltage, by using the charging/discharging circuit and the switch.

7 Claims, 13 Drawing Sheets

(56) References Cited

U.S. PATENT DOCUMENTS

| | | |
|---|---|---|
| 8,299,724 B2 | 10/2012 | Huynh |
| 8,305,001 B2 | 11/2012 | Horiuchi et al. |
| 8,471,495 B2 | 6/2013 | Muguruma et al. |
| 8,736,181 B2 | 5/2014 | Lee et al. |
| 2011/0025225 A1 | 2/2011 | Horiuchi et al. |
| 2011/0199003 A1 | 8/2011 | Muguruma et al. |
| 2012/0043896 A1 | 2/2012 | Lee et al. |
| 2012/0133289 A1 | 5/2012 | Hum et al. |
| 2012/0212143 A1 | 8/2012 | Esaki et al. |
| 2012/0229041 A1 | 9/2012 | Saes et al. |
| 2012/0299489 A1 | 11/2012 | Sakuragi et al. |

FOREIGN PATENT DOCUMENTS

| | | |
|---|---|---|
| JP | 2011-040701 A | 2/2011 |
| KR | 10-0971757 | 7/2010 |
| KR | 10-2011-0091444 A | 8/2011 |
| KR | 10-2012-0018646 A | 3/2012 |
| KR | 10-2012-0041093 A | 4/2012 |
| KR | 10-2012-0043188 A | 5/2012 |
| KR | 10-2012-0074502 A | 7/2012 |
| KR | 10-2012-0082468 A | 7/2012 |
| WO | WO 2011/030246 A2 | 3/2011 |
| WO | WO 2011/056068 A2 | 5/2011 |
| WO | WO 2012/131592 A1 | 10/2012 |

OTHER PUBLICATIONS

Masafumi Jinno et al., "Effective Illuminance Improvement of a Light Source by Using Pulse Modulation and Its Psychophysical Effect on the Human Eye", J. Light & Vis. Env., 2008, pp. 161-169, vol. 32, No. 2.

Zhang Yinxin et al., "Apparent Brightness of LEDs under Different dimming Methods", Proc of SPIE, 2008, pp. 684109-1-684109-5, vol. 6841.

International Search Report of PCT/KR2014/004561 mailed on Oct. 2, 2014.

\* cited by examiner

APPARATUS FOR DRIVING LIGHT EMITTING DIODE

TECHNICAL FIELD

The present invention relates to an apparatus for driving a light emitting diode. More particularly, the present invention pertains to an apparatus for driving a light emitting diode, which is capable of reducing a total harmonic distortion (THD) and improving a power factor and visibility.

BACKGROUND ART

A light-emitting diode (LED) has merits in terms of the light efficiency and the durability and, therefore, draws attention as a light source for a backlight of an illumination device or a display device.

The light-emitting diode is driven at a low direct current. Thus, in the related art, there has been used a power supply device for converting a commercial AC voltage (AC 220 V) to a DC voltage. For example, use has been made of a SMPS (Switched-Mode Power Supply), a linear power, etc. However, this power supply device is usually low in the conversion efficiency. Among the components used, an electrolytic capacitor is short in the lifespan. Thus, the use of the power supply device poses a problem of shortening the lifespan of a light-emitting diode illumination device.

In order to solve this problem, there has been developed a method in which two light-emitting diode strings are directly connected to an AC power supply in a forward direction and a reverse direction without performing DC conversion. However, this method suffers from a problem in that only 50% or less of the connected light-emitting diodes are turned on, consequently exhibiting low efficiency. Furthermore, a current flowing through the light-emitting diode is abruptly changed as a result of a change in the magnitude of an input voltage. This may adversely affect the light-emitting diode elements and may pose a problem in that a change in the brightness is large. In addition, a current is allowed to flow through a circuit only when the magnitude of an input voltage is equal to or larger than a value capable of operating all the light-emitting diodes included in the light-emitting diode strings. For that reason, a waveform difference between an alternating current flowing through the circuit and an AC voltage is large. This poses a problem in that the power factor is reduced.

In order to solve the problem inherent in the method of directly using an AC power supply, there have been developed different methods in which an alternating current is used after rectification through a bridge circuit. For example, Japanese Patent No. 4581646, U.S. Pat. No. 6,989,807, Japanese Patent Application Publication No. 2011-040701 and Korean Patent Application Publication No. 10-2012-0041093 discloses a method in which, after rectifying an AC voltage, the number of light-emitting diodes applied with the rectified voltage is adjusted depending on the change in the magnitude of the rectified voltage. In this method, as compared with a method of directly using an AC power supply, the number of operating light-emitting diodes increases. Therefore, this method has an advantage in that the efficiency is high and the current supply time is short, thereby improving the power factor.

The method of using an AC power supply after rectifying the same by means of a bridge circuit has a problem in that, since the light-emitting diodes are driven by a full-wave rectified wave having a frequency of 120 Hz, the magnitude of an AC power supply becomes equal to or smaller than a light-emitting diode driving voltage in a significant interval around a phase of 180 degrees, consequently generating a lighting failure.

Human eyes recognize a light source flickering at a flicker fusion frequency or higher as a continuously turned-on light source rather than an intermittently flickering light source. Accordingly, a light-emitting diode flickering at a flicker fusion frequency or higher is felt by human eyes as if it is continuously turned on. Most of the human eyes recognize a light source flickering at 75 Hz or higher as a continuously turned-on light source. However, a light-sensitive person may recognize the flicker of a light-emitting diode flickering at 120 Hz and, therefore, may suffer from photo-seizure. For that reason, it is preferred that the light-emitting diode flickers at a high frequency as far as possible.

In Japan, it is stipulated in the lighting certification standard that no flicker phenomenon should be generated between 100 Hz and 500 Hz. European countries are trying to stipulate that a lighting fixture should be driven at a frequency of 150 Hz or higher. In recent years, U.S.A. provides the energy star certification provision which prescribes that a lighting fixture having a flicker level not exceeding a predetermined level should be excluded from a certification candidate. Under these circumstances, there may be a situation that it is impossible to sell a light-emitting diode driven by a full-wave rectified wave.

In order to ameliorate this situation, Korean Patent Application Publication No. 10-2010-0104362 discloses a method which makes use of a valley fill circuit. This method is capable of providing a flicker phenomenon improvement effect. However, a capacitor having a large capacity has to be used in this method. Use of the capacitor poses an adverse effect in that the power factor becomes poor.

As another improvement method, it may be possible to use a charging/discharging circuit disclosed in Korean Patent Application Publication No. 10-2012-0082468. In this method, a flicker phenomenon is ameliorated. However, this method fails to overcome a limit that a flicker is generated at a frequency of 120 Hz. Moreover, if an input voltage decreases, charging is not sufficiently carried out and a discharging start point becomes shorter. Thus, the flicker phenomenon is conspicuous.

The method of using an AC power supply after rectifying the same by means of a bridge circuit has another problem. Specifically, if a driving voltage is set high, a phase interval where a light-emitting diode is turned on becomes small. This reduces the light-emitting diode use efficiency (the effective power consumption of the light-emitting diode/the power consumption of the light-emitting diode during the DC rated current operation) and the power factor. If a driving voltage is set low, a significant amount of electric power is consumed as heat and the power supply efficiency is reduced.

Korean Patent Application Publication No. 10-2012-0074502 discloses a lighting device provided with a charging/discharging block. In a charging interval, the charging/discharging block charges electric charges at a drive terminal. The charging/discharging block is discharged at a voltage equal to or less than a driving voltage of a light-emitting diode array, thereby removing an interval where the light-emitting diode array is turned off.

As a further method for improving the flicker phenomenon, there is available a method of increasing the flicker frequency of a light-emitting diode. U.S. Pat. No. 8,299,724 discloses a method in which a current flowing through a light-emitting diode array is cut off by an OVP (over-voltage protection) element when a drive terminal voltage is at a peak value, thereby increasing the flicker frequency of the light-emitting diode array to become four times as high as an input AC power supply frequency. However, this method suffers from a problem in that, if the drive terminal voltage is equal to or lower than the driving voltage of the light-emitting diode array, a turn-off interval becomes longer.

Furthermore, U.S. Patent Application Publication No. 2012-0229041 discloses a method in which electric energy is stored by means of an energy storing element such as a capacitor or the like. If the magnitude of a drive terminal voltage becomes equal to or smaller than a driving voltage of a light-emitting diode array, the energy storing element is discharged so that the frequency of a current applied to the light-emitting diode array becomes four times as high as an input AC power supply frequency.

In the meantime, as a method of realizing a high-efficiency lighting device and consequently saving electric energy, an attempt has been made to consider the aspect of psychophysics which studies the relationship between a cognitive phenomenon and a physical property of a stimulus.

In general, the amount of light energy generated in a lighting device is increased in proportion to the amount of input electric energy. However, it is another matter how human eyes recognize the light.

A light-emitting diode (LED) is controlled by a constant current control method which makes use of a DC power supply or a pulse width modulation (PWM) control method which makes use of a pulse voltage. The pulse width modulation control method is a control method in which electric power is controlled by adjusting a pulse frequency and a duty cycle.

Results of studies on how human eyes recognize the brightness of an intermittently flickering light source have been announced from 1900s.

According to the Talbot-Plateau law, it is said that a human who observes an intermittently flickering light source recognizes the light source as if it is continuously turned on at an average brightness.

Furthermore, according to the Broca-Sulzer law, it is said that when exposed to strong light such as camera flash light or the like, human eyes feel the light several times as bright as the actual light brightness.

According to the recent study conducted at Ehime University in Japan, it is said that if a pulse voltage is used, the Broca-Sulzer effect has a larger influence than the Talbot-Plateau effect, whereby human eyes recognize a light source to be brighter than an average brightness.

Moreover, according to the study conducted at Tianjin University in the People's Republic of China, it is said that if the average intensity remains the same as illustrated in FIG. 13, an LED driven by a PWM control method is felt brighter than an LED driven by a constant current control method.

In FIG. 13, the circle-plotted curve indicates the apparent brightness of a light emitting diode driven by a constant current control method and the triangle-plotted curve indicates a change in the apparent brightness depending on a change in a duty cycle of a light emitting diode driven by a PWM control method in the case where the PWM control method equal in average intensity to the constant current control method. The term "apparent brightness" refers to a psychological quantity of the contrast corresponding to the brightness which is a physical quantity of light. That is to say, the apparent brightness means a human-felt brightness rather than a real brightness.

Furthermore, as shown in FIG. 13, it can be noted that if a pulse voltage having a shorter duty cycle is used, a difference in apparent brightness between the PWM control method and the constant current control method becomes larger.

Referring to FIG. 13, it can be appreciated that if the frequency is 100 Hz and if the duty cycle is 50%, the light is felt about 40% brighter in the PWM control method than in the constant current control method. It can also be seen that if the duty cycle is 80%, the light is felt about 25% brighter in the PWM control method than in the constant current control method. It can be further noted that if the duty cycle is 100%, no difference in the brightness exists between the PWM control method and the constant current control method.

These results can also be confirmed in the study conducted at Ehime University in Japan. According to the study conducted at Ehime University, it is said that if an LED is driven at a duty cycle of 5% and at a pulse voltage of 60 Hz, the light is felt 120% brighter at the most in a PWM drive method than in a constant current drive method.

It can be expected from the results illustrated in FIG. 13 that if the average intensity remains the same, an LED driven by a pulse voltage having a larger intensity and a shorter duty cycle will be felt brighter than an LED driven by a pulse voltage having a smaller intensity and a longer duty cycle.

PRIOR ART DOCUMENT

Patent Document

Korean Patent No. 10-0971757
Korean Patent Application Publication No. 10-2012-0041093
Japanese Patent No. 4581646
U.S. Pat. No. 6,989,807
Japanese Patent Application Publication No. 2011-040701
Korean Patent Application Publication No. 10-2010-0104362
Korean Patent Application Publication No. 10-2012-0082468
Korean Patent Application Publication No. 10-2012-0074502
U.S. Pat. No. 8,299,724
U.S. Patent Application Publication No. 2012-0229041
Korean Patent Application Publication No. 10-2011-0091444

Non-Patent Document

Masafumi JINNO, Keiji MORITA, Yudai TOMITA, Yukinobu TODA, Hideki MOTOMURA (2008), "Effective illuminance improvement of light source by using pwm", J. Light & Vis. Env. Vol. 32, No. 2, 2008

Zhang Yinxin, Zhang Zhen, Huang Zhanhua, Cai Huaiyu, Xia Lin, Zhao Jie (2008), "Apparent Brightness of LEDs under Different dimming Methods" Proc. of SPIE Vol. 6841 684109

SUMMARY OF THE INVENTION

Technical Problems

In view of the aforementioned problems, it is an object of the present invention to provide an apparatus for driving a light emitting diode, which is capable of applying a pulse type voltage equal to or higher than a driving voltage of a light emitting diode to a turn-off interval around a phase of 180 degrees to thereby minimize a turn-off interval and enabling a light emitting diode to exhibit the same level of apparent brightness while consuming a relatively small amount of electric power.

Another object of the present invention is to provide an apparatus for driving a light emitting diode, which is capable of increasing a flicker frequency of a light emitting diode to thereby improve a flicker phenomenon.

A further object of the present invention is to provide an apparatus for driving a light emitting diode, which is capable of increasing a current of an output terminal of a rectifier circuit in response to an increase in instantaneous value of a voltage outputted from the rectifier circuit, reducing a total harmonic distortion of a drive terminal current waveform and improving a power factor.

Technical Solutions

In order to achieve the above objects, there is provided an apparatus for driving a light emitting diode, including: a rectifier circuit connected to an AC voltage source and configured to full-wave rectify an AC voltage of the AC voltage source; a light emitting diode array connected to an output side of the rectifier circuit, the light emitting diode array including a plurality of light emitting diode array blocks; and a charging/discharging circuit configured to be charged by a voltage outputted from the rectifier circuit. The apparatus further includes a discharging switch and a block switch circuit. The discharging switch is configured to connect or disconnect a route through which energy charged in the charging/discharging circuit is delivered to the light emitting diode array. The block switch circuit is configured to adjust the number of the light emitting diode array blocks to which the voltage outputted from the rectifier circuit is delivered. The controller is configured to control the discharging switch and the block switch circuit so that in an A interval where an instantaneous value of the voltage outputted from the rectifier circuit is smaller than a predetermined value, the charging/discharging circuit is discharged after the light emitting diode array as a whole is turned off and so that in the A interval, at least one of the light emitting diode array blocks is turned on and then turned off after the light emitting diode array as a whole is turned off at least once. Furthermore, the controller is configured to control the block switch circuit so that in a B interval where the instantaneous value of the voltage outputted from the rectifier circuit is equal to or larger than the predetermined value, the number of the light emitting diode array blocks being turned on is increased as the instantaneous value of the voltage outputted from the rectifier circuit becomes larger.

The apparatus may further include a flicker switch configured to connect or disconnect a route through which the voltage outputted from the rectifier circuit is delivered to the light emitting diode array. The controller may be configured to control the flicker switch so that the light emitting diode array flickers at least once in the B interval.

The apparatus may further include a power factor improving circuit connected to the output side of the rectifier circuit and configured to store or consume electric energy so as to reduce a total harmonic distortion of a waveform of an electric current outputted from the rectifier circuit.

The apparatus may further include a charging switch configured to connect or disconnect a route through which the voltage outputted from the rectifier circuit is delivered to the charging/discharging circuit. The controller may be configured to control the charging switch so that in the B interval, a time point at which the voltage outputted from the rectifier circuit is delivered to the charging/discharging circuit is delayed so as to reduce a total harmonic distortion of a waveform of an electric current outputted from the rectifier circuit.

The apparatus may further include a charged current limiting circuit configured to limit an electric current charged in the charging/discharging circuit so as to reduce the total harmonic distortion of the waveform of the electric current outputted from the rectifier circuit.

In the apparatus, the block switch circuit may include a bypass route configured to bypass at least one of the light emitting diode array blocks and a block switch installed in the bypass route.

The apparatus may further include a resistor installed in the bypass route and at least one of a current detector circuit serially connected to the light emitting diode array blocks and configured to detect an electric current flowing through the light emitting diode array blocks and a voltage detector circuit parallel-connected to the light emitting diode array blocks and configured to detect a voltage applied to the light emitting diode array blocks. The controller may be configured to switch off the block switch if a value of the electric current detected by the current detector circuit or a value of the voltage detected by the voltage detector circuit is equal to or larger than a predetermined value.

Advantageous Effects

The apparatus for driving a light emitting diode according to the present invention may apply, through the use of a charging/discharging circuit and a switch, a voltage higher than a driving voltage to an interval around a phase of 180 degrees where a voltage applied by an AC voltage source, which is equal to or lower than the driving voltage, cannot drive a light-emitting diode. This makes it possible to increase the flicker frequency of the light-emitting diode to become 240 Hz or higher (in the case of an AC power supply of 60 Hz). Since the light-emitting diode is flickered by the pulse voltage in the interval around the phase of 180 degrees where the light-emitting diode is turned off, the flicker frequency of the light-emitting diode increases twice. This makes it possible to improve a flicker phenomenon.

In a lighting system which makes use of the apparatus for driving a light emitting diode, the light-emitting diode is flickered by the pulse voltage in the interval around the phase of 180 degrees. This makes it possible to maintain the apparent brightness at the same level as that of a lighting system which makes use of other light emitting diode driving apparatuses, while consuming a relatively small amount of electric power according to the Broca-Sulzer law.

The apparatus for driving a light emitting diode according to the present invention may reduce a total harmonic distortion of a drive terminal current waveform and may improve a power factor by adjusting a charging start point of a charging/discharging circuit and by increasing a current of an output terminal of a rectifier circuit in response to an increase in the magnitude of a voltage outputted from the rectifier circuit.

In addition, the problem that if a driving voltage is set high, the light-emitting diode is not driven in a significant interval around a phase of 180 degrees, may be solved by a method in which a voltage higher than the driving voltage is applied to the interval around the phase of 180 degrees. This makes it possible to simultaneously improve the power supply efficiency and the light-emitting diode use efficiency.

MODE FOR CARRYING OUT THE INVENTION

The present invention will now be described in detail with reference to the accompanying drawings.

Embodiments described below are provided to sufficiently transfer the spirit of the present invention to a person skilled in the art. Accordingly, the present invention is not limited to the embodiments described below but may be embodied in many different forms.

Figure 1:
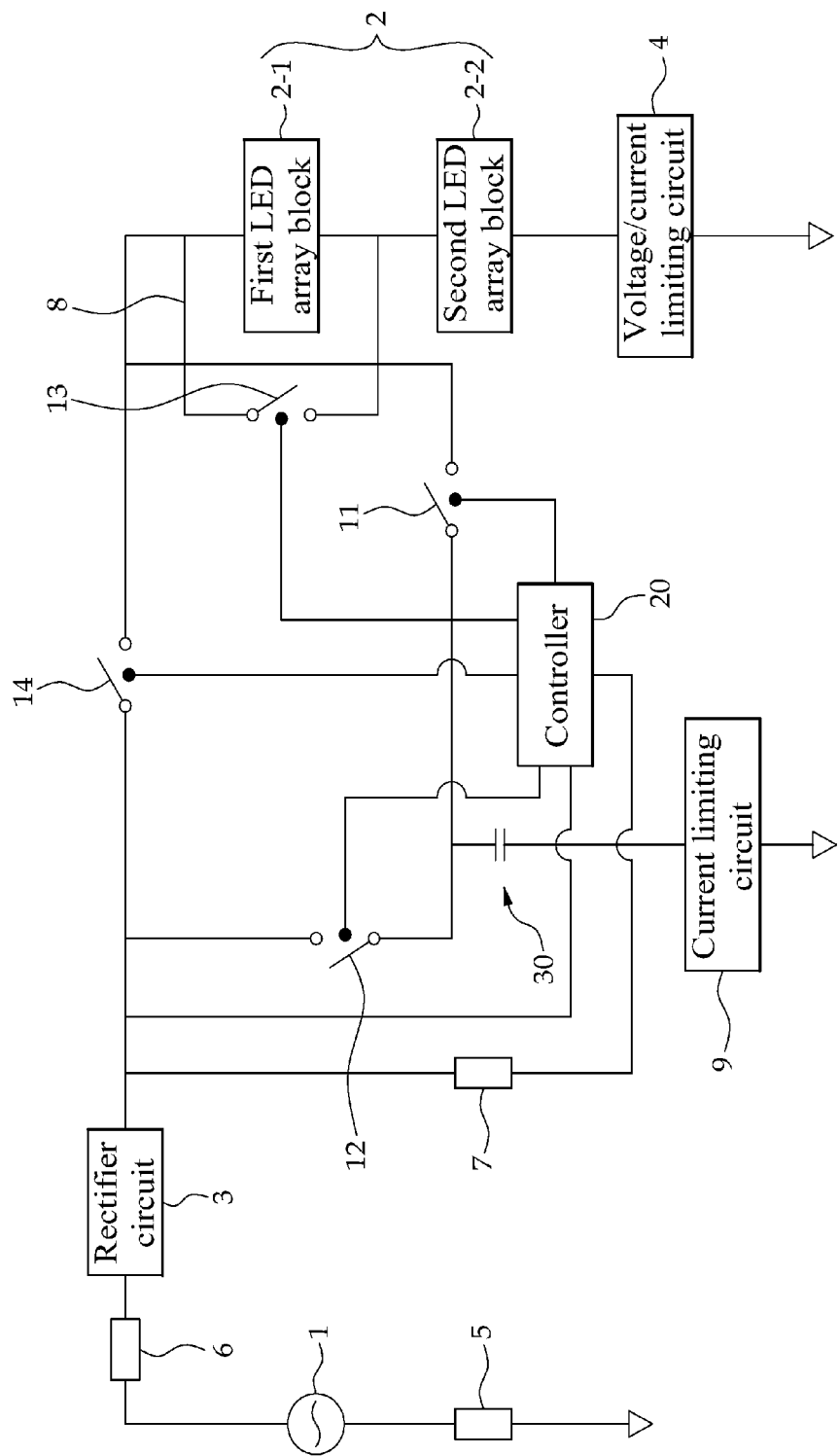
FIG. 1 is a view schematically illustrating one embodiment of an apparatus for driving a light emitting diode according to the present invention.

FIG. 1 is a view schematically illustrating one embodiment of an apparatus for driving a light emitting diode according to the present invention.

Referring to FIG. 1, the apparatus for driving a light emitting diode according to one embodiment of the present invention includes a light emitting diode array 2, a discharging switch 11, a charging switch 12, a block switch 13, a controller 20, a charging/discharging circuit 30, a rectifier circuit 3, a voltage/current limiting circuit 4 and a power factor improving circuit 7.

The light emitting diode array 2 of the apparatus for driving a light emitting diode includes a first light emitting diode array block 2-1 and a second light emitting diode array block 2-2 which are serially connected to each other. For example, when driven by an AC voltage of 220 V, the driving voltage of the first light emitting diode array block 2-1 may be about 50 V and the driving voltage of the second light emitting diode array block 2-2 may be about 200 V. Each of the first light emitting diode array block 2-1 and the second light emitting diode array block 2-2 may include one or more light emitting diodes which are connected in series, in parallel or in series and parallel.

In the apparatus for driving a light emitting diode according to one embodiment of the present invention, the second light emitting diode array block 2-2 or the light emitting diode array 2 as a whole is driven depending on a change in the instantaneous value of a voltage outputted from the rectifier circuit 3.

In a B interval where the instantaneous value is equal to or larger than a predetermined value Vt, the number of the light emitting diode array blocks to be turned on is increased as the instantaneous value becomes larger. The number of the light emitting diode array blocks to be turned on is decreased as the instantaneous value becomes smaller. That is to say, the light emitting diode array 2 as a whole is turned on as the instantaneous value becomes larger after the second light emitting diode array block 2-2 is turned on. Then, as the instantaneous value becomes smaller, the first light emitting diode array block 2-1 is turned off and only the second light emitting diode array block 2-2 is kept turned on. In this regard, the Vt value may be a minimum voltage value capable of driving the second light emitting diode array block 2-2.

In an A interval where the instantaneous value is smaller than the predetermined value Vt, the light emitting diode array blocks are not turned on by the voltage outputted from the rectifier circuit 3. In the A interval, the instantaneous value is small. Thus, the second light emitting diode array block 2-2 is not turned on by the voltage outputted from the rectifier circuit 3. In the A interval, the instantaneous value may be equal to or larger than a value capable of turning on the first light emitting diode array block 2-1. However, as illustrated in FIG. 1, due to the configuration of a circuit, the voltage outputted from the rectifier circuit 3 cannot be applied to only the first light emitting diode array block 2-1. Therefore, the light emitting diode array 2 as a whole is turned off if the instantaneous value reaches the A interval. After a predetermined time is elapsed, the light emitting diode array 2 as a whole or the second light emitting diode array block 2-2 is turned on by the electric energy supplied from the charging/discharging circuit 30 and is then turned off again. In the case where the block switch 13 is in an on-state, only the second light emitting diode array block 2-2 flickers. In the case where the block switch 13 is in an off-state, the light emitting diode array 2 as a whole flickers.

The apparatus for driving a light emitting diode according to one embodiment of the present invention effectively controls a charging start time and a discharging start time of the charging/discharging circuit 30 connected to the rectifier circuit 3 and enables the light emitting diode array 2 to flicker at least once even when the instantaneous value of the voltage outputted from the rectifier circuit 3 falls within the A interval. This makes it possible to increase the light-emitting diode use efficiency (the effective power consumption of the light-emitting diode/the power consumption of the light-emitting diode during the DC rated current operation). It is also possible to improve the flick phenomenon and to enhance the visibility.

The rectifier circuit 3 serves to full-wave rectify an inputted AC voltage. The rectifier circuit 3 may be a bridge diode circuit. As illustrated in FIG. 1, the rectifier circuit 3 is connected to an AC voltage source 1.

The switches 11, 12 and 13 may be configured by MOS-FET (Metal Oxide Semiconductor Field Effect Transistor) elements or the like. The discharging switch 11, which is installed in a route that interconnects the charging/discharging circuit 30 and the input terminal of the light-emitting diode array 2, and the charging switch 12, which is installed in a route that interconnects the output terminal of the rectifier circuit 3 and the charging/discharging circuit 30, are used to adjust the discharging start point and the charging start point of the charging/discharging circuit 30. By adjusting the charging start point, it is possible to adjust the waveform of the current flowing through the output terminal of the rectifier circuit 3 so as to become similar to the voltage waveform, thereby suppressing a harmonic distortion. By adjusting the discharging start point, it is possible to enable the light emitting diode array 2 as a whole or one of the light emitting diode array blocks 2-1 and 2-2 to flicker at least once.

If the charging switch 12 is switched on, the output terminal of the rectifier circuit 3 and the charging/discharging circuit 30 are connected to each other, whereby charging is performed in the charging/discharging circuit 30. If the discharging switch 11 is switched on, the charging/discharging circuit 30 and the light emitting diode array 2 are connected to each other, whereby discharging is performed in the charging/discharging circuit 30. Thus, electric power is supplied to the light emitting diode array 2.

The block switch 13 is installed in a bypass route 8 of the first light emitting diode array block 2-1. In the present embodiment, the block switch 13 and the bypass route 8 constitute a block switch circuit. If the block switch 13 is switched off, an electric current flows through the entirety of the light emitting diode array 2. If the block switch 13 is switched on, an electric current flows through only the second light emitting diode array block 2-2. That is to say, the block switch 13 serves to determine whether to allow an electric current to flow through only the second light emitting diode array block 2-2 or through the entirety of the light emitting diode array 2. Instead of installing a switch on a bypass line as illustrated in FIG. 1, the block switch circuit may be configured in many different forms by, for example, installing one or more switching elements on a line which interconnects different elements.

The controller 20 checks the magnitude or the phase of the voltage outputted from the rectifier circuit 3 and controls the discharging switch 11 and the charging switch 12, thereby controlling the discharging start point and the charging start point.

Furthermore, the controller 20 controls the on/off time of the block switch 13. If the magnitude of the voltage outputted from the rectifier circuit 3 or the charging/discharging circuit 30 is equal to or higher than the driving voltage of the light-emitting diode array 2, the block switch 13 is switched off to disconnect the bypass route 8 so that an electric current flows through the entirety of the light emitting diode array 2.

Figure 2:
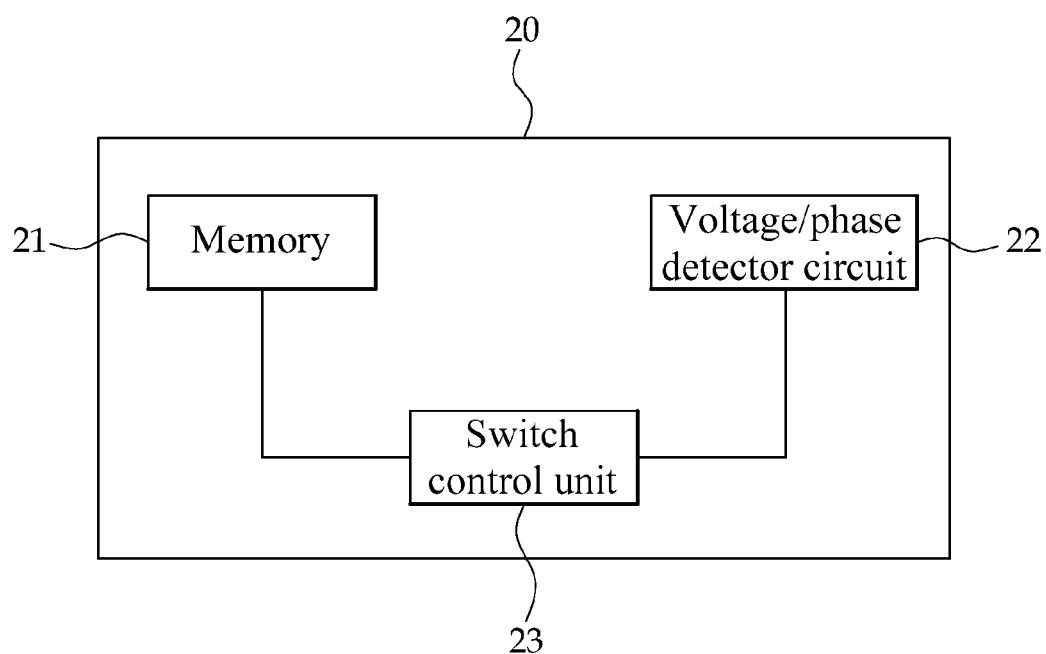
FIG. 2 is a block diagram of a controller illustrated in FIG. 1.

FIG. 2 is a block diagram of the controller illustrated in FIG. 1. Referring to FIG. 2, the controller 20 may include a voltage/phase detector circuit 22 and/or a switch control unit 23 and/or a memory 21. A voltage detector circuit determines a range within which the instantaneous value of the voltage outputted from the rectifier circuit 3 falls. As the voltage detector circuit, it may be possible to use different circuits which are widely used in the field of electronic circuits. For example, a voltage comparator which employs a plurality of operational amplifiers may be used as the voltage detector circuit. The controller 20 may employ a phase detector circuit instead of the voltage detector circuit that directly detects the voltage. The phase detector circuit may be configured by a zero-crossing detector that can detect the moment at which the instantaneous value of the voltage becomes 0. Since the instantaneous value of the voltage outputted from the rectifier circuit 3 varies depending on the phase, it is possible to know the change in the instantaneous value from the change in the phase. In the case where the input power is unstable, it is preferable to use the voltage detector circuit.

In the memory 21, there are stored drive data for driving the switches 11, 12 and 13 depending on the magnitude of the voltage outputted from the rectifier circuit 3. The drive data are determined depending on the number of light-emitting diodes, the driving voltage, the required flicker frequency of the light-emitting diodes, etc.

Instead of using the memory 21, the switches 11, 12 and 13 may be controlled depending on the voltage or the phase detected on a channel-by-channel basis or using a counter element such as a timer or the like.

The charging/discharging circuit 30 is charged by the output voltage of the rectifier circuit 3 in the B interval and is then discharged in the A interval, thereby applying electric power to the light-emitting diode array 2. In the present embodiment, a capacitor is used as one example of the charging/discharging circuit 30. If the charging switch 12 is switched on, the charging/discharging circuit 30 is connected to the rectifier circuit 3 and electric energy is stored in the charging/discharging circuit 30. If the discharging switch 11 is switched on, the charging/discharging circuit 30 is connected to the light-emitting diode array 2. Thus, discharging occurs in the charging/discharging circuit 30 to supply electric power to the light-emitting diode array 2. An inductor may be used as the charging/discharging circuit 30.

A voltage/current limiting circuit 4 serves to limit the current or the voltage applied to a load. The voltage/current limiting circuit 4 is used to prevent an excessive current from flowing through the light-emitting diode array 2 and is serially connected to the light-emitting diode array 2. A current limiting circuit may be configured by a resistor, a capacitor, a bipolar transistor, a MOS transistor, etc. Furthermore, the current limiting circuit may be configured by a field effect transistor (FET) or a combination of a transistor (TR) and an auxiliary element or by an integrated circuit such as an operational amplifier or a regulator.

Furthermore, the apparatus for driving a light emitting diode according to one embodiment of the present invention may further include a surge protection circuit for protecting the apparatus from a surge voltage. The surge protection circuit may be configured by a resistor 6, a surge suppression element (not illustrated), a fuse 5, etc.

Moreover, the apparatus for driving a light emitting diode may further include a power factor improving circuit 7 configured to store or consume energy in order to minimize a difference between a current waveform and a voltage waveform at the output terminal of the rectifier circuit 3. The power factor improving circuit 7 may be formed of a resistor or a capacitor and a switch. For example, the power factor improving circuit 7 may include a resistor parallel-connected to the rectifier circuit 3 and a switch installed in a route which interconnects the resistor and the rectifier circuit 3. If the switch is switched on at the initial stage of, e.g., the A interval and the B interval where the difference between a current waveform and a voltage waveform is large, the voltage of the output terminal of the rectifier circuit 3 is applied to the resistor. A current having a sine waveform flows through the resistor in proportion to the voltage. In the A interval, a current does not flow toward the light-emitting diode array 2. Thus, the current flowing through the resistor becomes equal to the current flowing through the output terminal of the rectifier circuit 3. By bringing the form of the current at the output terminal of the rectifier circuit 3 into substantial conformity with the form of the voltage in this way, it is possible to improve the power factor. It is also possible to prevent a large amount of current from suddenly flowing toward the second light emitting diode array block 2-2 and to prevent a large amount of harmonic component from being generated in the current waveform at the output terminal of the rectifier circuit 3 during the transition from the A interval to the B interval.

In the case where a capacitor capable of storing energy is used as the power factor improving circuit 7, the stored energy may be utilized to supply drive power to the controller 20 and the switches 11, 12 and 13.

The apparatus for driving a light emitting diode according to one embodiment of the present invention may further include a flicker switch 14 which serves to pulse-drive the light emitting diode array 2. The flicker switch 14 serves to change the flicker frequency of the light emitting diode array 2. In the case where the flicker switch 14 is repeatedly turned on and off, the second light emitting diode array block 2-2 or the entirety of the light emitting diode array 2 is driven by the pulse voltage. The type of the pulse voltage is determined by adjusting the on-time period and the off-time period of the flicker switch 14.

The flicker switch 14 may serve as an OVP (over-voltage protection) element which cuts off an electric current flowing through the light emitting diode array 2 when the voltage of a drive terminal has a peak value.

The apparatus for driving a light emitting diode according to one embodiment of the present invention may further include a charged current limiting circuit 9 configured to limit a current charged in the charging/discharging circuit 30 in order to reduce a total harmonic distortion of a current waveform. The charged current limiting circuit 9 is serially connected to the charging/discharging circuit 30 to limit the electric current flowing through the charging/discharging circuit 30. The charged current limiting circuit 9 may be realized by a resistor, a capacitor, a bipolar transistor, a MOS transistor, etc.

Figure 3A:
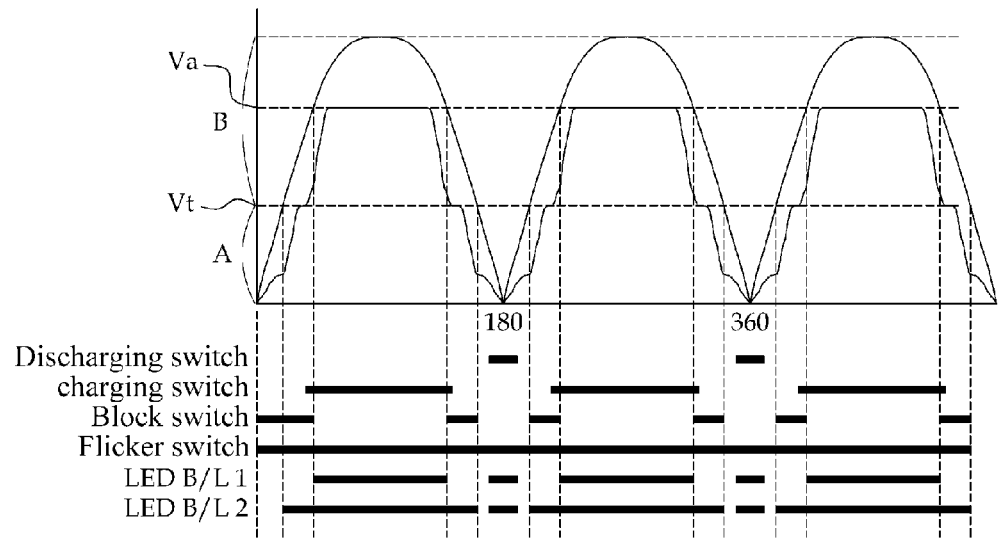
FIG. 3A is a view illustrating one example of a voltage waveform and a current waveform of an input source in the apparatus for driving a light emitting diode illustrated in FIG. 1.
Figure 3B:
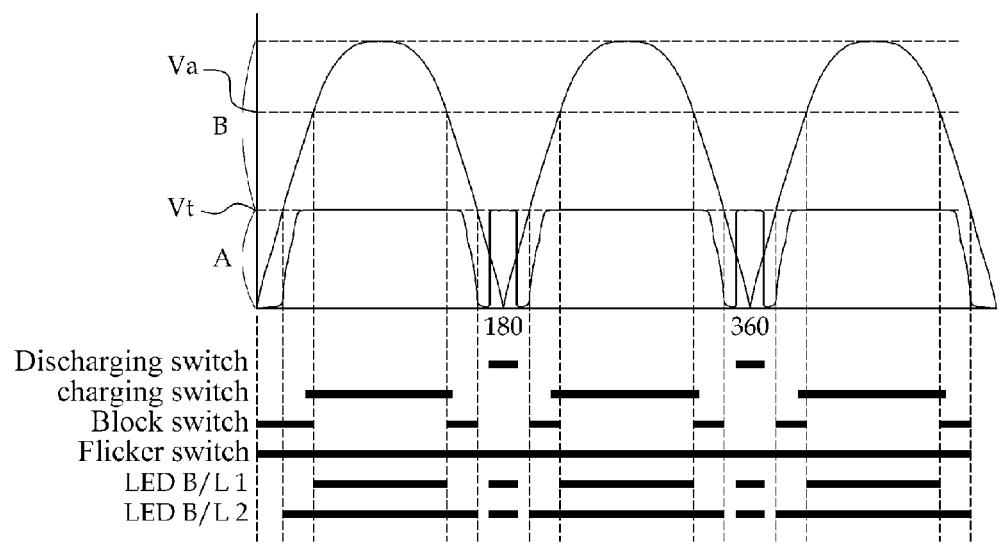
FIG. 3B is a view illustrating one example of a voltage waveform of an input source and a current waveform applied to a light emitting diode array in the apparatus for driving a light emitting diode illustrated in FIG. 1.

FIG. 3A is a view illustrating one example of a voltage waveform and a current waveform of an input source in the apparatus for driving a light emitting diode illustrated in FIG. 1. FIG. 3B is a view illustrating one example of a voltage waveform of an input source and a current waveform applied to the light emitting diode array in the apparatus for driving a light emitting diode illustrated in FIG. 1. A one-cycle operation of the apparatus for driving a light emitting diode will be described with reference to FIGS. 3A and 3B.

If it is determined by the controller 20 that the instantaneous value of the voltage outputted from the rectifier circuit 3 falls within the A interval, the controller 20 turns off the discharging switch 11 and the charging switch 12 and turns on the block switch 13 (Since charging is not performed as yet, discharging does not occur even if the discharging switch 11 is turned on).

In the A interval, as illustrated in FIG. 3B, an electric current does not flow through the second light emitting diode array block 2-2. As illustrated in FIG. 3A, an electric current having a sine waveform similar to a voltage waveform flows through the power factor improving circuit 7.

In the B interval where the magnitude of the voltage outputted from the rectifier circuit 3 is equal to or larger than Vt, the second light emitting diode array block 2-2 may be turned on by the voltage outputted from the rectifier circuit 3. Thus, the second light emitting diode array block 2-2 is turned on. Since the block switch 13 of the bypass route 8 is switched on, an electric current does not flow through the first light emitting diode array block 2-1. As illustrated in FIG. 3B, the electric current flowing through the second light emitting diode array block 2-2 is increased as the magnitude of the voltage outputted from the rectifier circuit 3 becomes larger. However, the electric current flowing through the second light emitting diode array block 2-2 is limited by the voltage/current limiting circuit 4 so as not to increase beyond a predetermined level.

If the magnitude of the voltage outputted from the rectifier circuit 3 becomes equal to or larger than a value Va capable of turning on the entirety of the light emitting diode array 2, the controller 20 switches off the block switch 13. As the block switch 13 of the bypass route 8 is switched off, the entirety of the light emitting diode array 2 is turned on. At this time, as illustrated in FIG. 3B, an electric current limited by the voltage/current limiting circuit 4 continues to flow through the light emitting diode array 2.

The controller 20 switches on the charging switch 12 at a predetermined time point in the B interval, thereby allowing an electric current to flow through the charging/discharging circuit 30. At this time, as illustrated in FIG. 3A, the value of an electric current flowing through the input terminal of the circuit becomes larger. The electric current flowing through the light emitting diode array 2 is limited and kept constant by the voltage/current limiting circuit 4. However, the value of an electric current flowing through the input terminal of the circuit is increased just as much as the value of an electric current flowing through the charging/discharging circuit 30. The value of an electric current flowing through the charging/discharging circuit 30 is limited by the charged current limiting circuit 9. By bringing the current waveform of the circuit close to the input voltage waveform in this way, it is possible to reduce the total harmonic distortion of the current waveform and to improve the power factor. The turn-on time point and turn-off time point of the charging switch 12 and the amount of the charged current may be adjusted within the B interval so as to bring the current waveform close to the input voltage waveform.

If the magnitude of the voltage outputted from the rectifier circuit 3 reaches an interval where the magnitude of the voltage is smaller than Va, the controller 20 switches on the block switch 13 again, thereby allowing an electric current to flow through only the second light emitting diode array block 2-2.

If the magnitude of the voltage outputted from the rectifier circuit 3 reaches the A interval again, the controller 20 switches on the discharging switch 11 after a predetermined time is elapsed. Thus, the electric energy charged in the capacitor is supplied to the light emitting diode array 2 so that the light emitting diode array 2 is turned off and then turned on. Thereafter, the discharging switch 11 is switched off so that the light emitting diode array 2 is turned off. At this time, the discharging start and stop time points are determined in conjunction with variables such as a forward voltage of the light emitting diode array 2, a charging capacity, a voltage variation in the input source and a preset drive frequency. By adjusting the discharging start time point and the discharging stop time point, it is possible to adjust the turn-off time period and the turn-on time period of the entirety of the light emitting diode array 2 in the A interval.

At this time, as illustrated in FIGS. 3A and 3B, an electric current does not substantially flow through the input terminal. However, an electric current as electric energy supplied from the charging/discharging circuit 30 flows through the light emitting diode array 2.

Figure 4A:
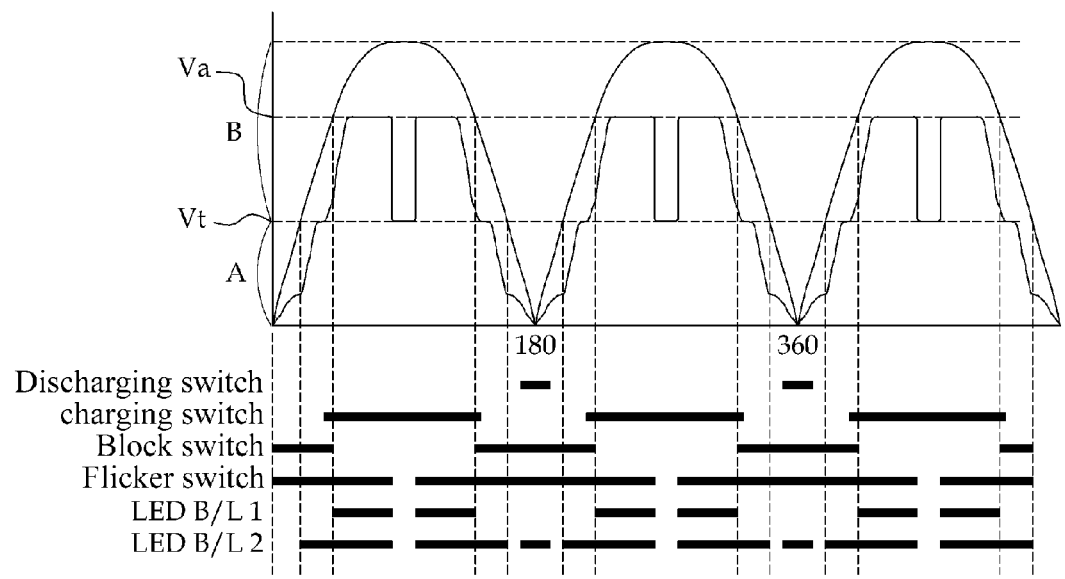
FIG. 4A is a view illustrating another example of a voltage waveform and a current waveform of an input source in the apparatus for driving a light emitting diode illustrated in FIG. 1.
Figure 4B:
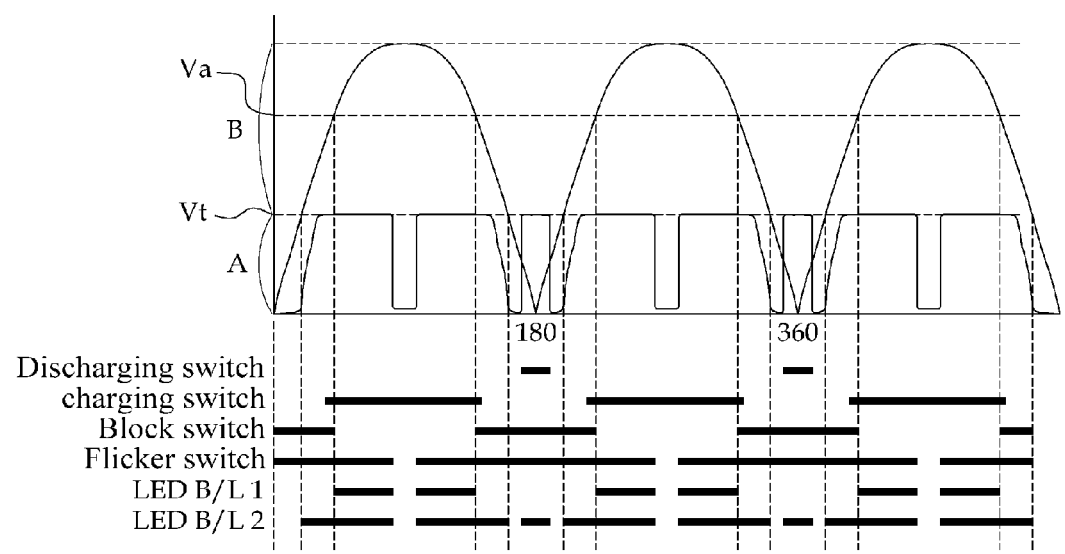
FIG. 4B is a view illustrating another example of a voltage waveform of an input source and a current waveform applied to a light emitting diode array in the apparatus for driving a light emitting diode illustrated in FIG. 1.

FIG. 4A is a view illustrating another example of a voltage waveform and a current waveform of an input source in the apparatus for driving a light emitting diode illustrated in FIG. 1. FIG. 4B is a view illustrating another example of a voltage waveform of an input source and a current waveform applied to the light emitting diode array in the apparatus for driving a light emitting diode illustrated in FIG. 1. In this example, the light emitting diode array 2 flickers in the B interval and the flicker frequency of the light emitting diode array 2 is increased to 240 Hz or more.

The operations of the discharging switch 11 and the charging switch 12 are the same as those illustrated in FIGS. 3A and 3B. Only the operation of the flicker switch 14 in the B interval and the operation of the block switch 13 in the A interval will be described below.

If the magnitude of the voltage outputted from the rectifier circuit 3 reaches the B interval where the light emitting diode array 2 is to be turned off, the flicker switch 14 is switched off and then switched on after a predetermined time is elapsed. In the case where the flicker switch 14 is flickered once in the B interval, the flicker frequency is increased to 360 Hz as illustrated in FIGS. 4A and 4B.

In the case where there is a need to further increase the flicker frequency, it may be possible to increase the number of times being flickered. At this time, the duty cycle and the frequency may be adjusted by adjusting the on/off-time periods of the flicker switch 14. Preferably, the on/off-time periods of the flicker switch 14 are adjusted so that the average magnitude of the electric power applied to a load becomes constant. If the on-time period of the flicker switch 14 is made long in the interval where the magnitude of the voltage is small and if the on-time period of the flicker switch 14 is made short in the case where the magnitude of the voltage is large, it is possible to make constant the average magnitude of the electric power applied to a load.

In the present embodiment, if the magnitude of the voltage outputted from the rectifier circuit 3 reaches the A interval, the block switch 13 is kept in an on-state. Thus, only the second light emitting diode array block 2-2 rather than the entirety of the light emitting diode array 2 flickers in the A interval. In the case where, due to the limit of the charged current, the voltage charged in the charging/discharging circuit 30 is not sufficient to turn on the entirety of the light emitting diode array 2, the block switch 13 may be switched on in the A interval so that the electric current bypasses the first light emitting diode array block 2-1.

In FIG. 4A, there is illustrated a case where the electric current flowing through the light emitting diode array 2 is cut off at the off-time point of the flicker switch 14 and, therefore, the current value of the input source is reduced. However, in an effort to reduce the total harmonic distortion, the current waveform may be adjusted by a method of increasing the electric current flowing through the charging/discharging circuit 30 in the interval where the flicker switch 14 is switched off. For example, by adjusting the current limiting value of the charged current limiting circuit 9, it is possible to increase the electric current flowing through the charging/discharging circuit 30 in the interval where the flicker switch 14 is switched off.

Figure 5:
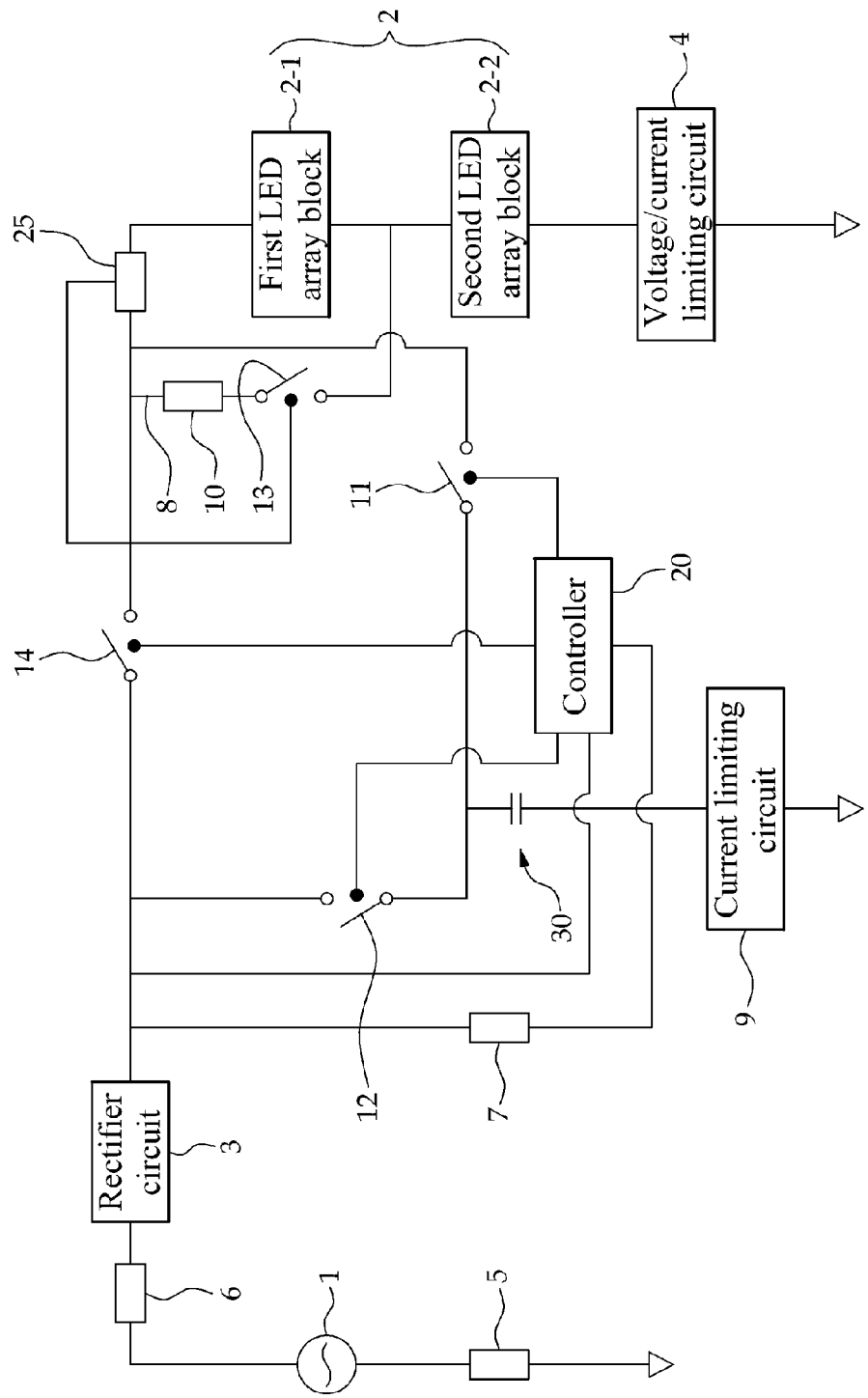
FIGS. 5 to 7 are views schematically illustrating further embodiments of an apparatus for driving a light emitting diode according to the present invention.

FIG. 5 is a view schematically illustrating an apparatus for driving a light emitting diode according to another embodiment of the present invention.

The present embodiment differs from the embodiment illustrated in FIG. 1 in terms of the control method of the block switch 13. Thus, descriptions will be made on only the differing point. In the embodiment illustrated in FIG. 1, the block switch 13 of the bypass route 8 is controlled by detecting, with controller 20, the change in the instantaneous value of the voltage outputted from the rectifier circuit 3. However, in the present embodiment, the block switch 13 is controlled using the current value detected by a current detector circuit 25 serially connected to the first light emitting diode array block 2-1. While the current detector circuit 25 serially connected to the first light emitting diode array block 2-1 is used in the embodiment illustrated in FIG. 5, it may be possible to control the block switch 13 using the voltage value detected by a voltage detector circuit parallel-connected to the first light emitting diode array block 2-1.

If the voltage outputted from the rectifier circuit 3 grows higher, the electric current flowing through the resistor 10 of the bypass route 8 gradually increases. If the magnitude of the voltage outputted from the rectifier circuit 3 becomes gradually larger and if the voltage applied to the resistor 10 of the bypass route 8 becomes a constant voltage equal to or higher than the driving voltage of the first light emitting diode array block 2-1, an electric current flows through the first light emitting diode array block 2-1 and the current detector circuit 25, both of which are parallel-connected to the resistor 10. If an electric current flows through the current detector circuit 25 and if the current detector circuit 25 transmits a detection signal to the block switch 13, the block switch 13 is switched off to disconnect the bypass route 8, thereby allowing the electric current to flow through the entirety of the light emitting diode array 2.

Figure 6:
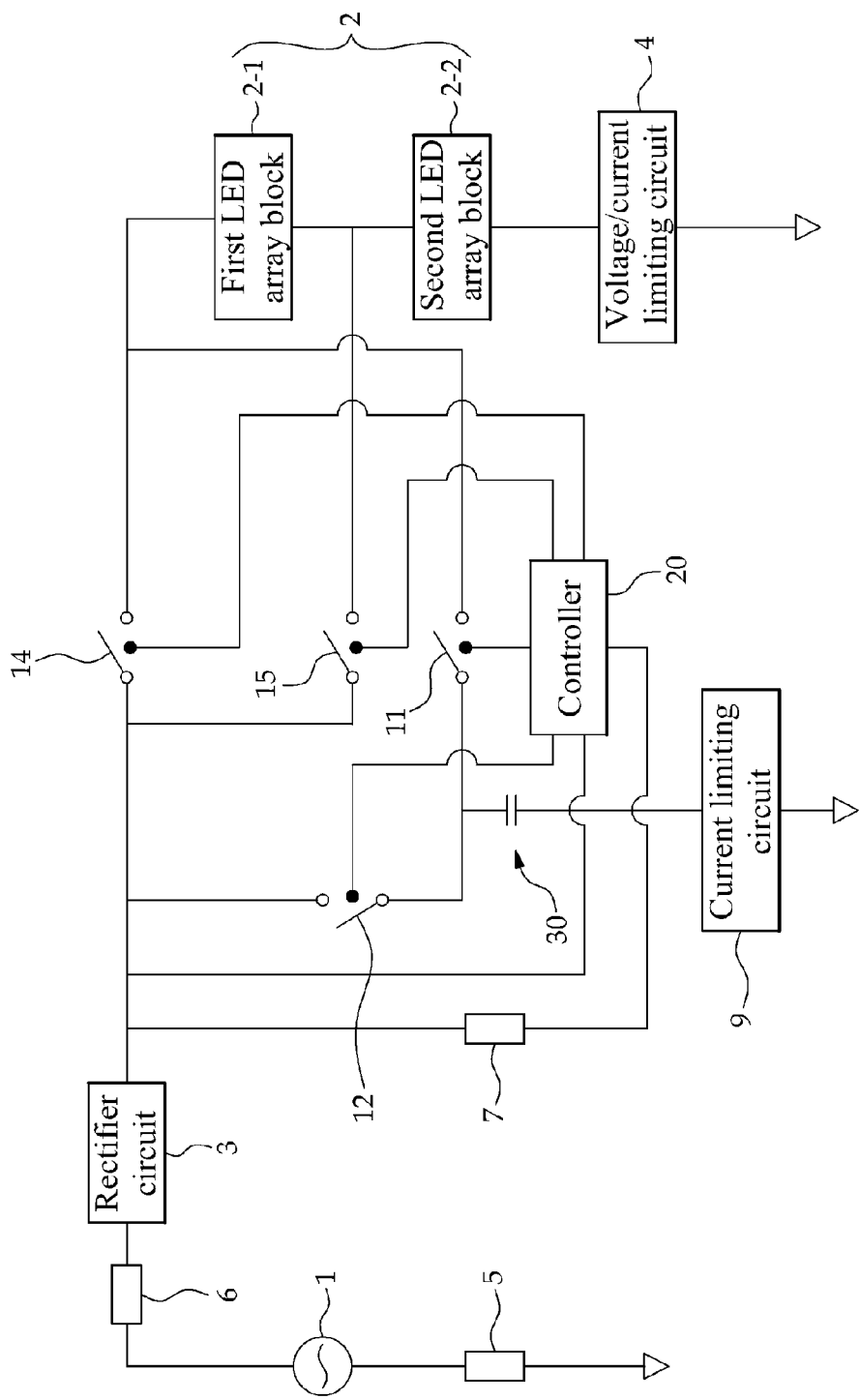

FIG. 6 is a view schematically illustrating an apparatus for driving a light emitting diode according to a further embodiment of the present invention.

The present embodiment differs from the embodiment illustrated in FIG. 1 in that the first light emitting diode array block 2-1 and the second light emitting diode array block 2-2 serially connected to each other are selectively driven depending on the change in the instantaneous value of the voltage outputted from the rectifier circuit 3. Thus, descriptions will be made on only the differing point. The present embodiment differs from the embodiment illustrated in FIG. 1 in terms of the configuration of a block switch 15.

In the present embodiment, unlike the embodiment illustrated in FIG. 1, a block switch 15 is installed in a route which interconnects the output terminal of the rectifier circuit 3 and the input terminal of the second light emitting diode array block 2-2.

In the present embodiment, the controller 20 switches on the block switch 15 in the B interval so that an electric current flows through only the second light emitting diode array block 2-2. If the voltage is increased to a level capable of turning on the entirety of the light emitting diode array 2, the block switch 15 is switched off so that an electric current flows through the entirety of the light emitting diode array 2. In the A interval, the block switch 15 is switched off and the discharging switch 11 is switched on so that an electric current flows through the entirety of the light emitting diode array 2 by virtue of the electric energy of the charging/discharging circuit 30. The flicker switch 14 may be continuously switched on in all the intervals. In the case where the flicker frequency is to be changed, the flicker switch 14 may be repeatedly switched on and off in the B interval.

Figure 7:
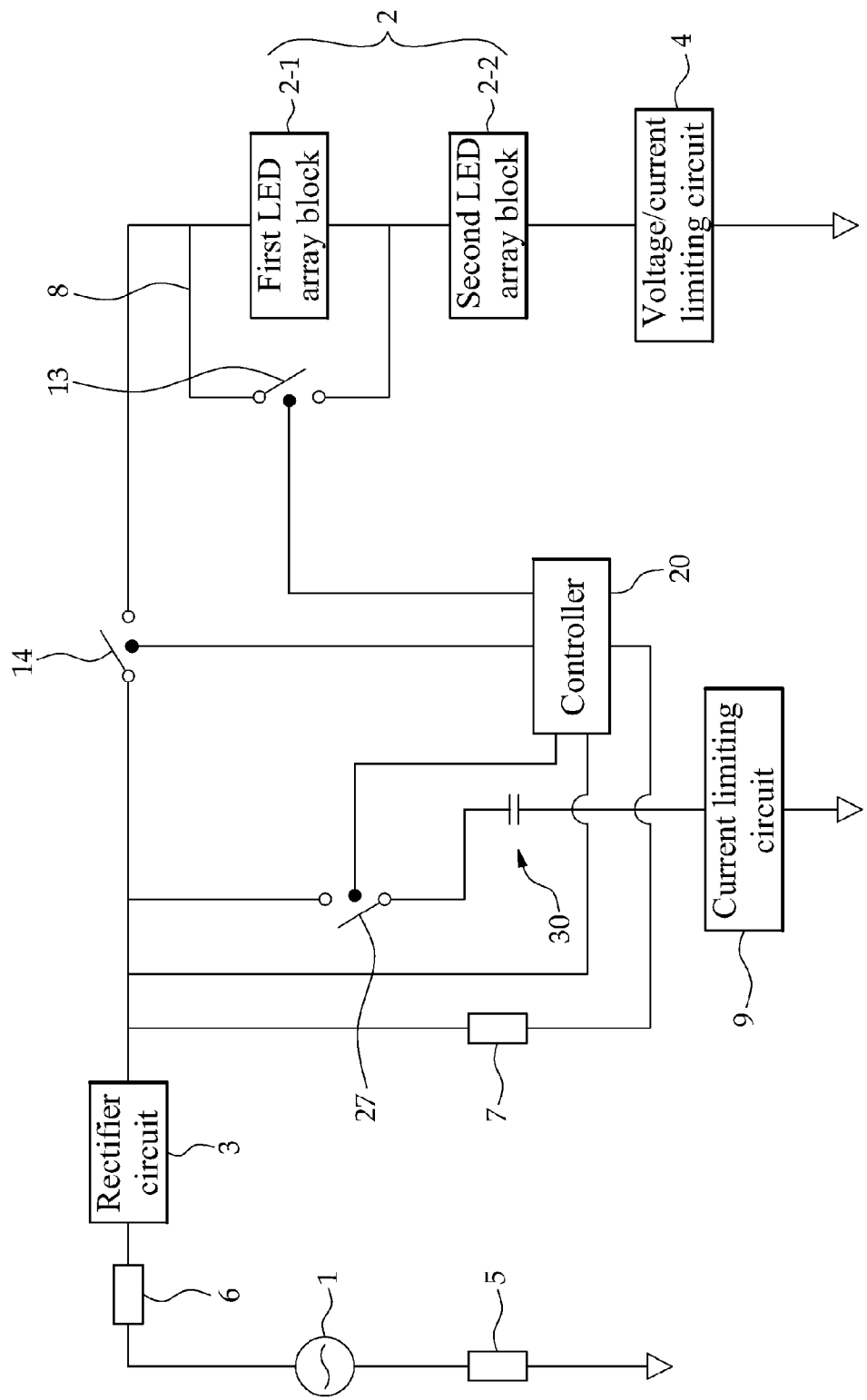

FIG. 7 is a view schematically illustrating an apparatus for driving a light emitting diode according to a further embodiment of the present invention.

In the present embodiment, a discharging switch 27 serially connected to the charging/discharging circuit 30 plays a role of a charging switch. That is to say, if the discharging switch 27 is switched on, charging is performed. If the discharging switch 27 is switched off, charging is stopped. If the discharging switch 27 is switched on in a charged state, discharging is performed. If the discharging switch 27 is switched off, discharging is stopped.

Figure 8A:
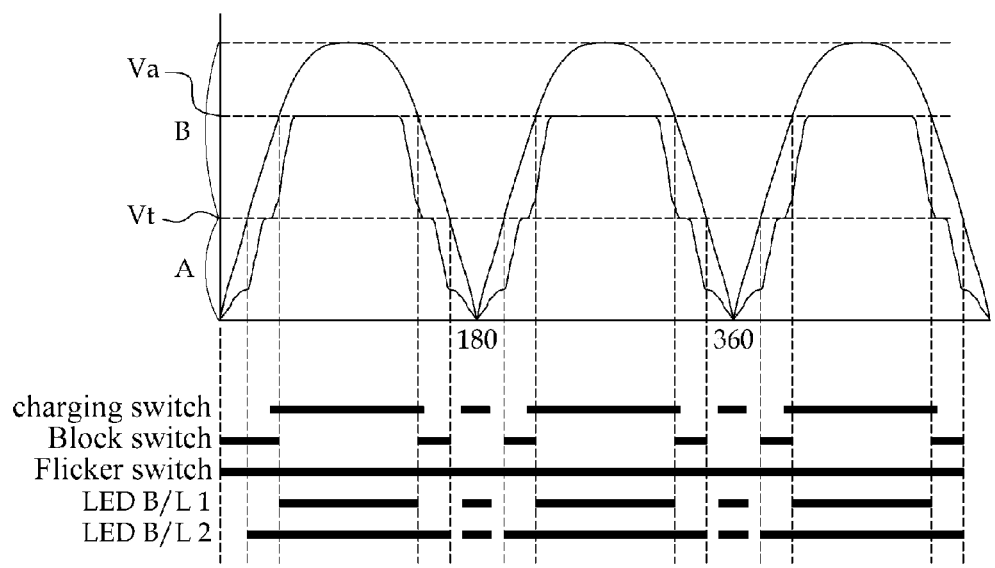
FIG. 8A is a view illustrating one example of a voltage waveform and a current waveform of an input source in the apparatus for driving a light emitting diode illustrated in FIG. 7.
Figure 8B:
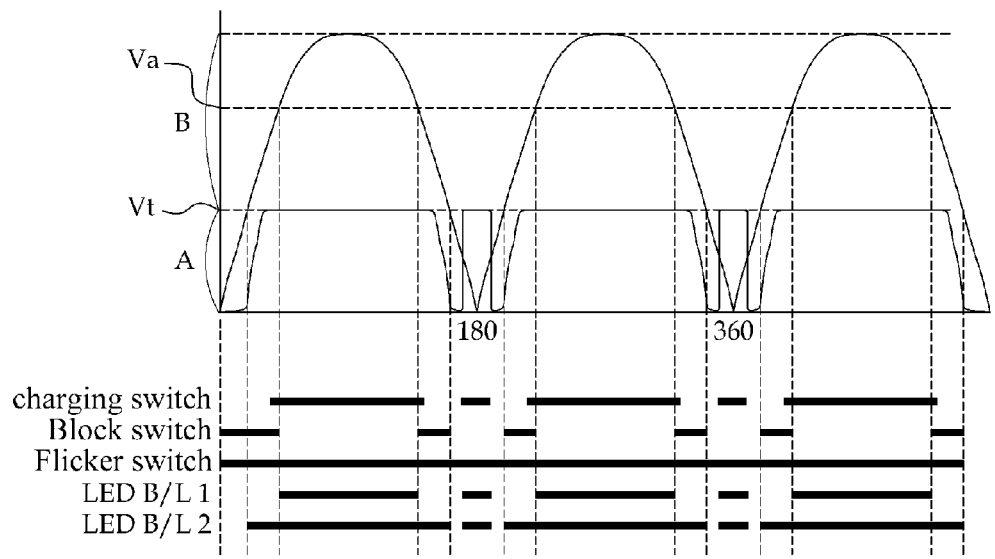
FIG. 8B is a view illustrating one example of a voltage waveform of an input source and a current waveform applied to a light emitting diode array in the apparatus for driving a light emitting diode illustrated in FIG. 7.

FIG. 8A is a view illustrating one example of a voltage waveform and a current waveform of an input source in the apparatus for driving a light emitting diode illustrated in FIG. 7. FIG. 8B is a view illustrating one example of a voltage waveform of an input source and a current waveform applied to the light emitting diode array in the apparatus for driving a light emitting diode illustrated in FIG. 7. A one-cycle operation of the apparatus for driving a light emitting diode will now be described with reference to FIGS. 8A and 8B.

If it is determined by the controller 20 that the magnitude of the voltage outputted from the rectifier circuit 3 falls within the A interval where the magnitude of the voltage is smaller than the driving voltage of the second light emitting diode array block 2-2, the controller 20 switches off the discharging switch 27 and switches on the block switch 13.

Since the magnitude of the voltage outputted from the rectifier circuit 3 is smaller than the driving voltage of the second light emitting diode array block 2-2, an electric current does not flow through the second light emitting diode array block 2-2 as can be seen in FIG. 8B. An electric current having a sine waveform flows through the power factor improving circuit 7 as illustrated in FIG. 8A.

If the magnitude of the voltage outputted from the rectifier circuit 3 reaches the B interval which covers the driving voltage of the second light emitting diode array block 2-2, the voltage outputted from the rectifier circuit 3 becomes equal to or higher than the driving voltage of the second light emitting diode array block 2-2. Thus, the second light emitting diode array block 2-2 is turned on. Since the block switch 13 of the bypass route 8 is switched on, an electric current does not flow through the first light emitting diode array block 2-1. The electric current flowing through the second light emitting diode array block 2-2 is increased as the magnitude of the voltage outputted from the rectifier circuit 3 grows larger. However, the electric current flowing through the second light emitting diode array block 2-2 is limited by the voltage/current limiting circuit 4 so as not to increase to a predetermined level or more.

If the magnitude of the voltage outputted from the rectifier circuit 3 reaches an interval where the entirety of the light emitting diode array 2 can be turned on, the controller 20 switches off the block switch 13. Since the block switch 13 of the bypass route 8 is switched off, the entirety of the light emitting diode array 2 is turned on. At this time, as illustrated in FIG. 8B, an electric current limited by the voltage/current limiting circuit 4 flows through the light emitting diode array 2.

From the time point at which the discharging switch 27 is switched on in the B interval, an electric current flows through the charging/discharging circuit 30. Therefore, as illustrated in FIG. 8A, the value of an electric current flowing through the input terminal of the circuit becomes larger. The electric current flowing through the light emitting diode array 2 is limited and kept constant by the voltage/current limiting circuit 4. However, the value of an electric current flowing through the input terminal of the circuit is increased just as much as the value of an electric current flowing through the charging/discharging circuit 30. The value of an electric current flowing through the charging/discharging circuit 30 is limited by the charged current limiting circuit 9.

If the magnitude of the voltage outputted from the rectifier circuit 3 becomes smaller again, the controller 20 switches on the block switch 13 again so that an electric current flows through only the second light emitting diode array block 2-2.

If the discharging switch 27 is switched off in the B interval, the charging/discharging circuit 30 is disconnected from the second light emitting diode array block 2-2 and is maintained in a state in which electric energy is stored in the charging/discharging circuit 30.

If the magnitude of the voltage outputted from the rectifier circuit 3 reaches the A interval again, the controller 20 switches on the discharging switch 27 after a predetermined time is elapsed. Thus, the electric energy charged in the capacitor is supplied to the light emitting diode array 2 so that the light emitting diode array 2 is turned off and then turned on. Thereafter, the discharging switch 27 is switched off again so that the light emitting diode array 2 is turned off.

Figure 9:
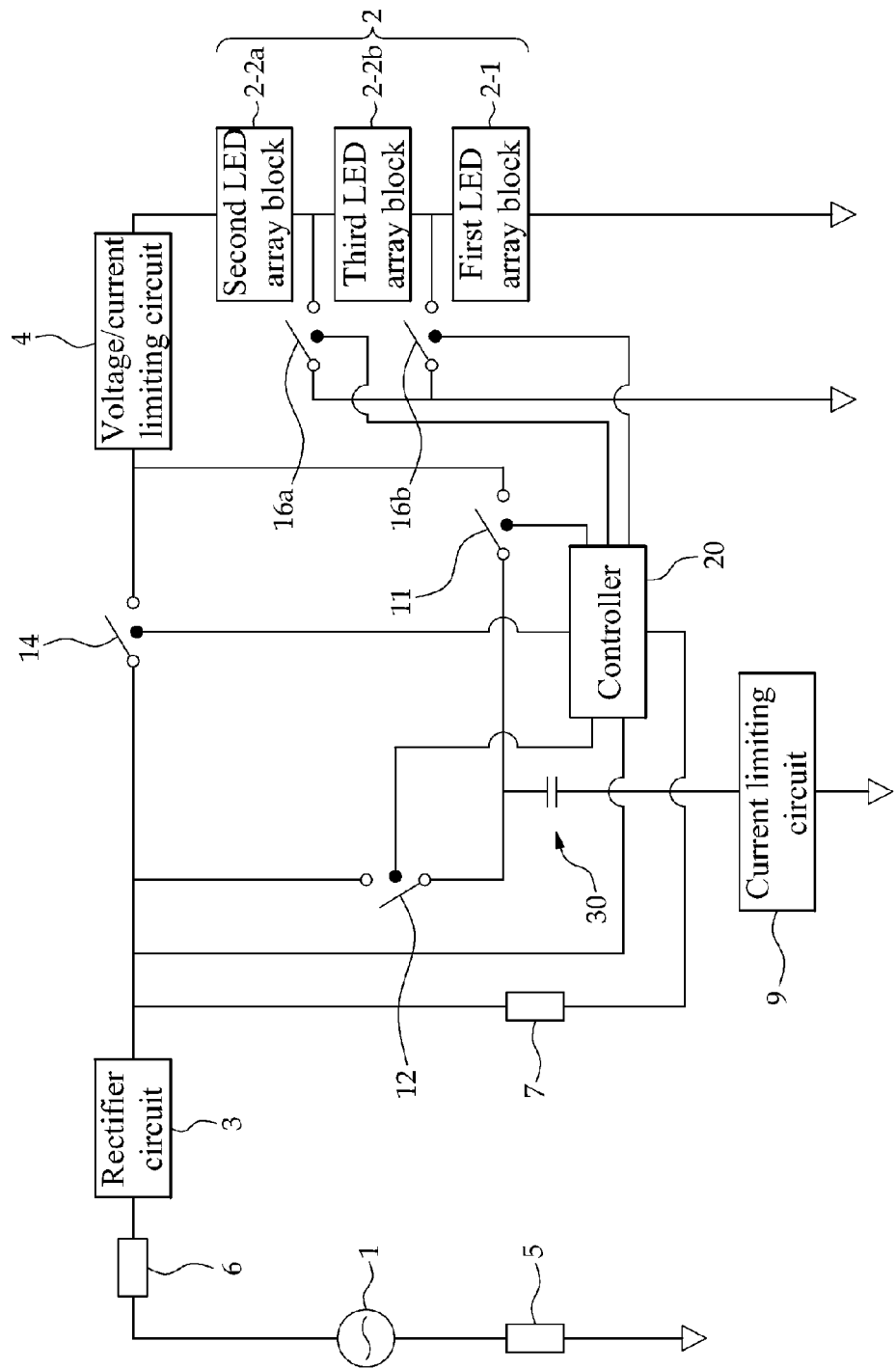
FIG. 9 is a view schematically illustrating a further embodiment of an apparatus for driving a light emitting diode according to the present invention.

FIG. 9 is a view schematically illustrating an apparatus for driving a light emitting diode according to a further embodiment of the present invention.

The present embodiment differs from the aforementioned embodiments in terms of the configuration of the light emitting diode array 2. In the present embodiment, the light emitting diode array 2 includes first, second and third light emitting diode array blocks 2-1, 2-2a and 2-2b. In the light emitting diode array 2, as the magnitude of the voltage outputted from the rectifier circuit 3 in the B interval becomes larger, the second light emitting diode array block 2-2a is first turned on and then the second light emitting diode array block 2-2a and the third light emitting diode array block 2-2b are simultaneously turned on. If the magnitude of the voltage becomes further larger, the entirety of the light emitting diode array 2 is turned on. That is to say, as the magnitude of the voltage becomes larger in the B interval, the number of the light emitting diodes being turned on increases.

In the present embodiment, a first block switch 16a is switched on at the initial stage of the B interval. Thus, an electric current flows through only the second light emitting diode array block 2-2a. If the magnitude of the voltage becomes larger so that the second light emitting diode array block 2-2a and the third light emitting diode array block 2-2b can be simultaneously turned on, the first block switch 16a is switched off and the second block switch 16b is switched on. Thus, an electric current flows through the second light emitting diode array block 2-2a and the third light emitting diode array block 2-2b. If the magnitude of the voltage becomes further larger, the first block switch 16a and the second block switch 16b are switched off. Thus, an electric current flows through the entirety of the light emitting diode array 2.

In the A interval, the first block switch 16a and the second block switch 16b may be controlled so that the number of the light emitting diode array blocks being turned on is reduced as the magnitude of the voltage outputted from the charging/discharging circuit 30 becomes smaller. In the case where a sufficient amount of electric energy is stored in the charging/discharging circuit 30, the entirety of the light emitting diode array 2 may be turned on and then turned off after a predetermined time is elapsed. However, in the case where a sufficient amount of electric energy is not stored due to the current limiting function, the first block switch 16*a* and the second block switch 16*b* may be controlled so that the number of the light emitting diode array blocks being turned on is reduced as the magnitude of the voltage outputted from the charging/discharging circuit 30 becomes smaller and so that the entirety of the light emitting diode array 2 is turned off after a predetermined time is elapsed.

Figure 10:
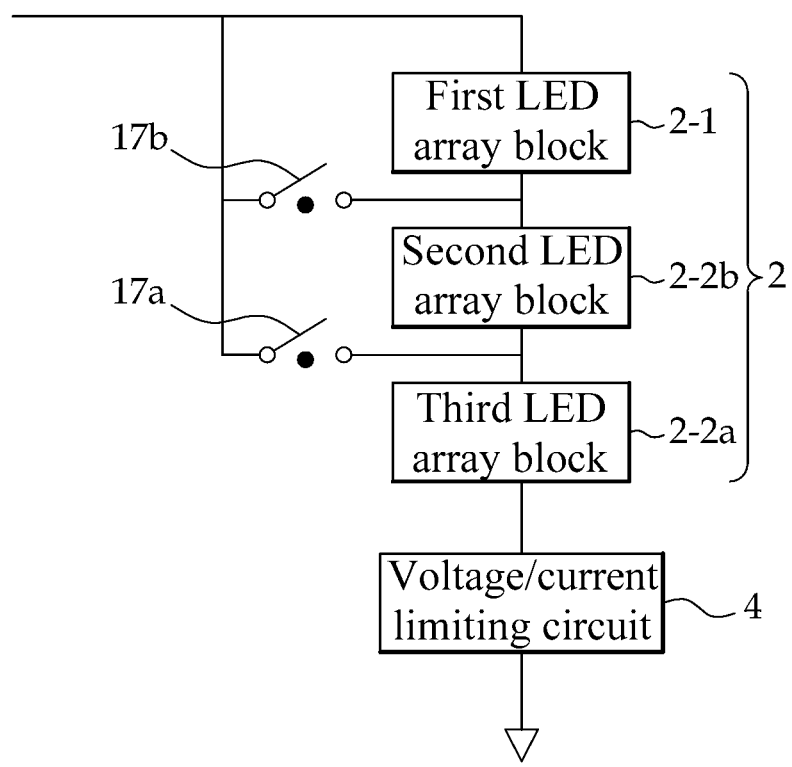
FIGS. 10 to 12 are views schematically illustrating some portions of further embodiments of an apparatus for driving a light emitting diode according to the present invention.
Figure 11:
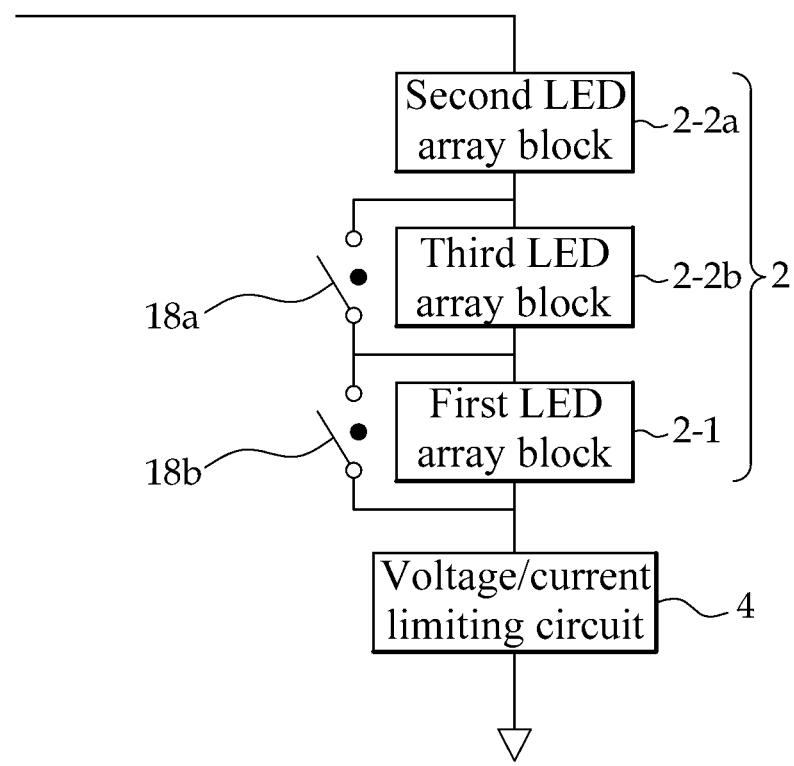
Figure 12:
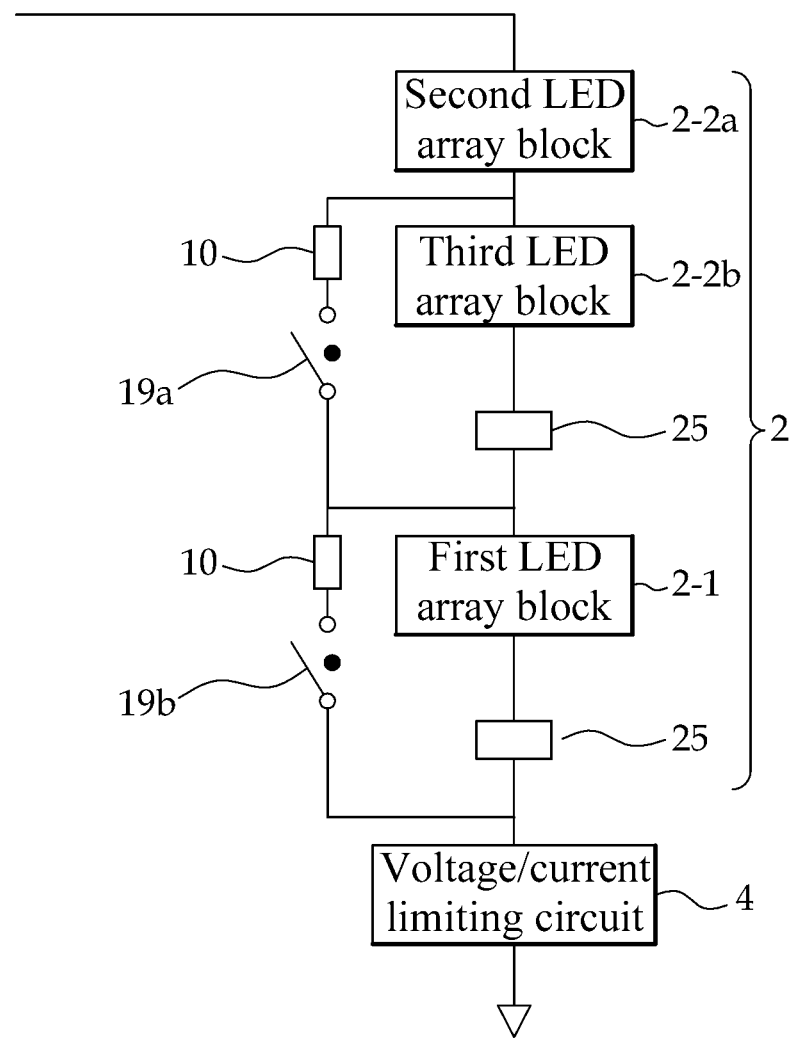
Figure 13:
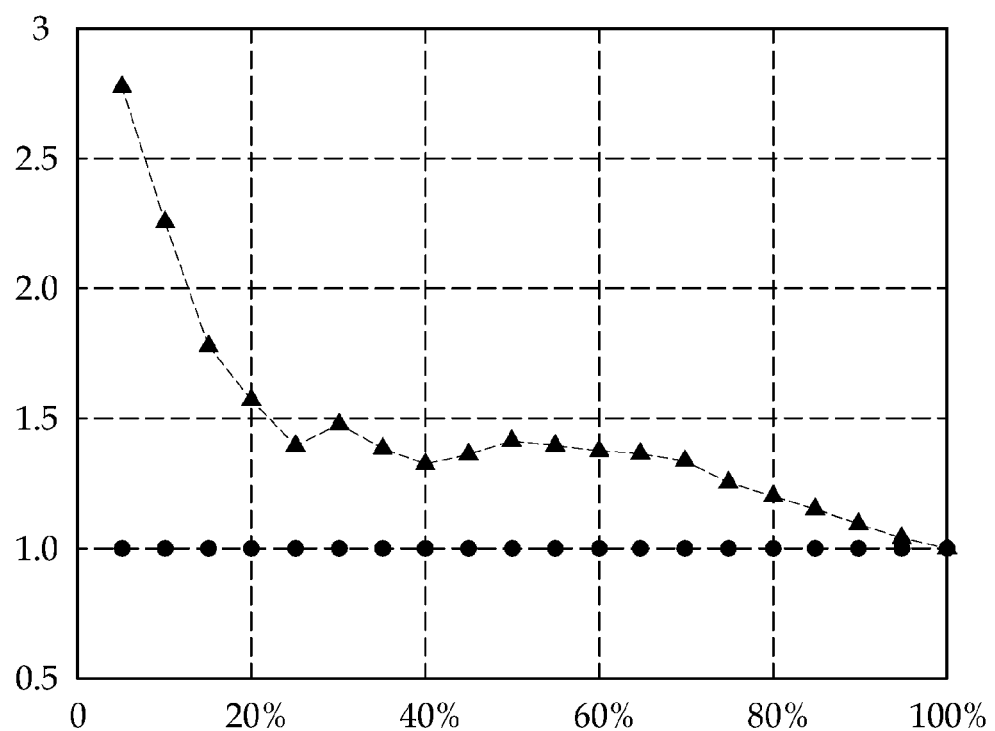
FIG. 13 is a graph showing a change in a ratio of apparent brightness to average intensity depending on a duty cycle.

FIGS. 10 to 12 are views schematically illustrating some portions of further embodiments of an apparatus for driving a light emitting diode according to the present invention.

In the embodiment illustrated in FIG. 10, the first block switch 17*a* is switched on at the initial stage of the B interval. Thus, an electric current flows through only the second light emitting diode array block 2-2*a*. If the magnitude of the voltage becomes larger so that the second light emitting diode array block 2-2*a* and the third light emitting diode array block 2-2*b* can be simultaneously turned on, the first block switch 17*a* is switched off and the second block switch 17*b* is switched on. Thus, an electric current flows through the second light emitting diode array block 2-2*a* and the third light emitting diode array block 2-2*b*. If the magnitude of the voltage becomes further larger, the first block switch 17*a* and the second block switch 17*b* are switched off. Thus, an electric current flows through the entirety of the light emitting diode array 2.

In the embodiment illustrated in FIG. 11, the first block switch 18*a* and the second block switch 18*b* are switched on at the initial stage of the B interval. Thus, an electric current flows through only the second light emitting diode array block 2-2*a*. If the magnitude of the voltage becomes larger so that the second light emitting diode array block 2-2*a* and the third light emitting diode array block 2-2*b* can be simultaneously turned on, the first block switch 18*a* is switched off. Thus, an electric current flows through the second light emitting diode array block 2-2*a* and the third light emitting diode array block 2-2*b*. If the magnitude of the voltage becomes further larger, the first block switch 18*a* and the second block switch 18*b* are switched off. Thus, an electric current flows through the entirety of the light emitting diode array 2.

In the embodiment illustrated in FIG. 12, similar to the embodiment illustrated in FIG. 5, the first block switch 19*a* and the second block switch 19*b* are controlled by detecting, with the current detector circuit 25, the electric current flowing through the third light emitting diode array block 2-2*b* and the first light emitting diode array block 2-1. In this respect, the embodiment illustrated in FIG. 12 differs from the embodiment illustrated in FIG. 10.

It is to be understood that the embodiments described above are exemplary in all respects and are not limitative. The scope of the present invention is defined by the appended claims rather than the forgoing descriptions. All the changes and modifications derived from the claims and the equivalent concept thereof shall be construed to fall within the scope of the present invention.

For example, the block switch for selectively supplying an electric current to the blocks of the light emitting diode array may be realized in many different forms. These modifications of the block switch fall within the scope of the present invention.

In the embodiments illustrated in FIGS. 9 to 12, the light emitting diode array is configured to include three light emitting diode array blocks. Alternatively, the light emitting diode array may include four or more light emitting diode array blocks.

DESCRIPTION OF REFERENCE SYMBOL

1: AC voltage source, 2: light-emitting diode array, 2-1: first light emitting diode array block, 2-2: second light emitting diode array block, 3: rectifier circuit, 7: power factor improving circuit, 8; bypass route, 9: charged current limiting circuit, 11, 27: discharging switch, 12: charging switch, 13, 15: block switch, 14: flicker switch, 20: controller, 25: current detector circuit, 30: charging/discharging circuit

What is claimed is:

1. An apparatus for driving a light emitting diode, comprising:
   a rectifier circuit connected to an AC voltage source and configured to full-wave rectify an AC voltage of the AC voltage source;
   a light emitting diode array connected to an output side of the rectifier circuit, the light emitting diode array including a plurality of light emitting diode array blocks;
   a charging/discharging circuit configured to be charged by a voltage outputted from the rectifier circuit;
   a discharging switch configured to connect or disconnect a route through which energy charged in the charging/discharging circuit is delivered to the light emitting diode array;
   a block switch circuit configured to adjust the number of the light emitting diode array blocks to which the voltage outputted from the rectifier circuit is delivered; and
   a controller configured to control the discharging switch and the block switch circuit so that in an A interval where an instantaneous value of the voltage outputted from the rectifier circuit is smaller than a predetermined value, the charging/discharging circuit is discharged after the light emitting diode array as a whole is turned off and so that in the A interval, at least one of the light emitting diode array blocks is turned on and then turned off after the light emitting diode array as a whole is turned off at least once,
   wherein the controller is configured to control the block switch circuit so that in a B interval where the instantaneous value of the voltage outputted from the rectifier circuit is equal to or larger than the predetermined value, the number of the light emitting diode array blocks being turned on is increased as the instantaneous value of the voltage outputted from the rectifier circuit becomes larger.

2. The apparatus of claim 1, further comprising:
   a flicker switch configured to connect or disconnect a route through which the voltage outputted from the rectifier circuit is delivered to the light emitting diode array,
   wherein the controller is configured to control the flicker switch so that the light emitting diode array flickers at least once in the B interval.

3. The apparatus of claim 1, further comprising:
   a power factor improving circuit connected to the output side of the rectifier circuit and configured to store or consume electric energy so as to reduce a total harmonic distortion of a waveform of an electric current outputted from the rectifier circuit.

4. The apparatus of claim 1, further comprising:
   a charging switch configured to connect or disconnect a route through which the voltage outputted from the rectifier circuit is delivered to the charging/discharging circuit,
   wherein the controller is configured to control the charging switch so that in the B interval, a time point at which the voltage outputted from the rectifier circuit is delivered to the charging/discharging circuit is delayed so as to reduce a total harmonic distortion of a waveform of an electric current outputted from the rectifier circuit.

5. The apparatus of claim 4, further comprising:
a charged current limiting circuit configured to limit an electric current charged in the charging/discharging circuit so as to reduce the total harmonic distortion of the waveform of the electric current outputted from the rectifier circuit.

6. The apparatus of claim 1, wherein the block switch circuit includes a bypass route configured to bypass at least one of the light emitting diode array blocks and a block switch installed in the bypass route.

7. The apparatus of claim 6, further comprising:
a resistor installed in the bypass route; and
at least one of a current detector circuit serially connected to the light emitting diode array blocks and configured to detect an electric current flowing through the light emitting diode array blocks and a voltage detector circuit parallel-connected to the light emitting diode array blocks and configured to detect a voltage applied to the light emitting diode array blocks,
wherein the controller is configured to switch off the block switch if a value of the electric current detected by the current detector circuit or a value of the voltage detected by the voltage detector circuit is equal to or larger than a predetermined value.

* * * * *